March 24, 1959

T. W. POWELL 2,879,383

SIGNAL MONITORING APPARATUS

Filed May 13, 1957

2 Sheets-Sheet 1

INVENTOR.
Truman W. Powell
BY
Shrew, Crowe & Gordon
ATTORNEYS

March 24, 1959 T. W. POWELL 2,879,383

SIGNAL MONITORING APPARATUS

Filed May 13, 1957

2 Sheets-Sheet 2

INVENTOR.

Truman W. Powell

BY

Shreve, Crowe + Gordon

ATTORNEYS

United States Patent Office 2,879,383

Patented Mar. 24, 1959

2,879,383

SIGNAL MONITORING APPARATUS

Truman W. Powell, Atlanta, Ga.

Application May 13, 1957, Serial No. 658,732

9 Claims. (Cl. 250—20)

The present invention relates to a signal monitoring apparatus or more particularly to an electronically actuated signal monitoring apparatus, the operation of which is dependent upon the reception of radio frequency signals of predetermined frequency. The instant apparatus may be used in applications where an alerting signal of predetermined radio frequency actuates a monitoring portion of the apparatus which in turn causes a secondary or alerting portion of the apparatus to be activated. While the instant apparatus may be used in a variety of industrial and civilian applications, the principle of operation makes it particularly useful for the unattended monitoring and reception of Conelrad alerts for civil defense purposes and by operators of radio broadcasting equipment, commercial, industrial and amateur services which are presently required by law to have available monitoring equipment in order that radio broadcasting, except for civil defense purposes, may be discontinued during an alert.

A variety of equipment for this latter purpose is presently available but employs principles and circuits which have a singular purpose only for the reception of Conelrad alerts and require the continuous operation of the entire equipment whereas the apparatus and principles of the instant invention permit conventional radio receivers to be modified to receive such alerts and yet not require the continuous full operation of the receiver apparatus resulting in economy of operation.

Equipment presently available for this purpose relies for its operation principally upon the fact that, in the event of an alert, modulation of the broadcast carrier frequency would cease which causes signalling means such as lights, buzzers, etc. to be activated. There are often circumstances where broadcasting stations transmit only a carrier for short periods of time and under such conditions equipments operating on the principle last mentioned would give false alarms.

It is therefore a principal object of the present invention to provide an electronic signal monitoring apparatus wherein a continuously operating, unattended monitoring circuit responsive to predetermined radio frequencies automatically actuates an alerting circuit.

It is a further object of the present invention to convert conventional radio receivers to permit dual operation as a radio receiver and an alerting apparatus.

It is a further object of the present invention to include in a conventional radio receiver unattended, continuously operating monitoring and alerting circuits including components, which upon reception of predetermined frequencies by such monitoring circuit are activated to convert such radio receiver to an alerting apparatus.

It is a further object of the present invention to provide an electronic alerting apparatus including an unattended, continuously operating electronic monitoring apparatus responsive to the reception of predetermined radio frequencies and plural frequency receiving apparatus capable of conversion to a single predetermined frequency receiving apparatus upon reception of such predetermined frequency by such monitoring apparatus.

These and other objects will become apparent as the description proceeds in which Fig. 1 is a schematic diagram of a portion of a conventional superheterodyne receiver modified to include components to perform as the alerting apparatus of the instant invention;

Figures 1, 2, 4:
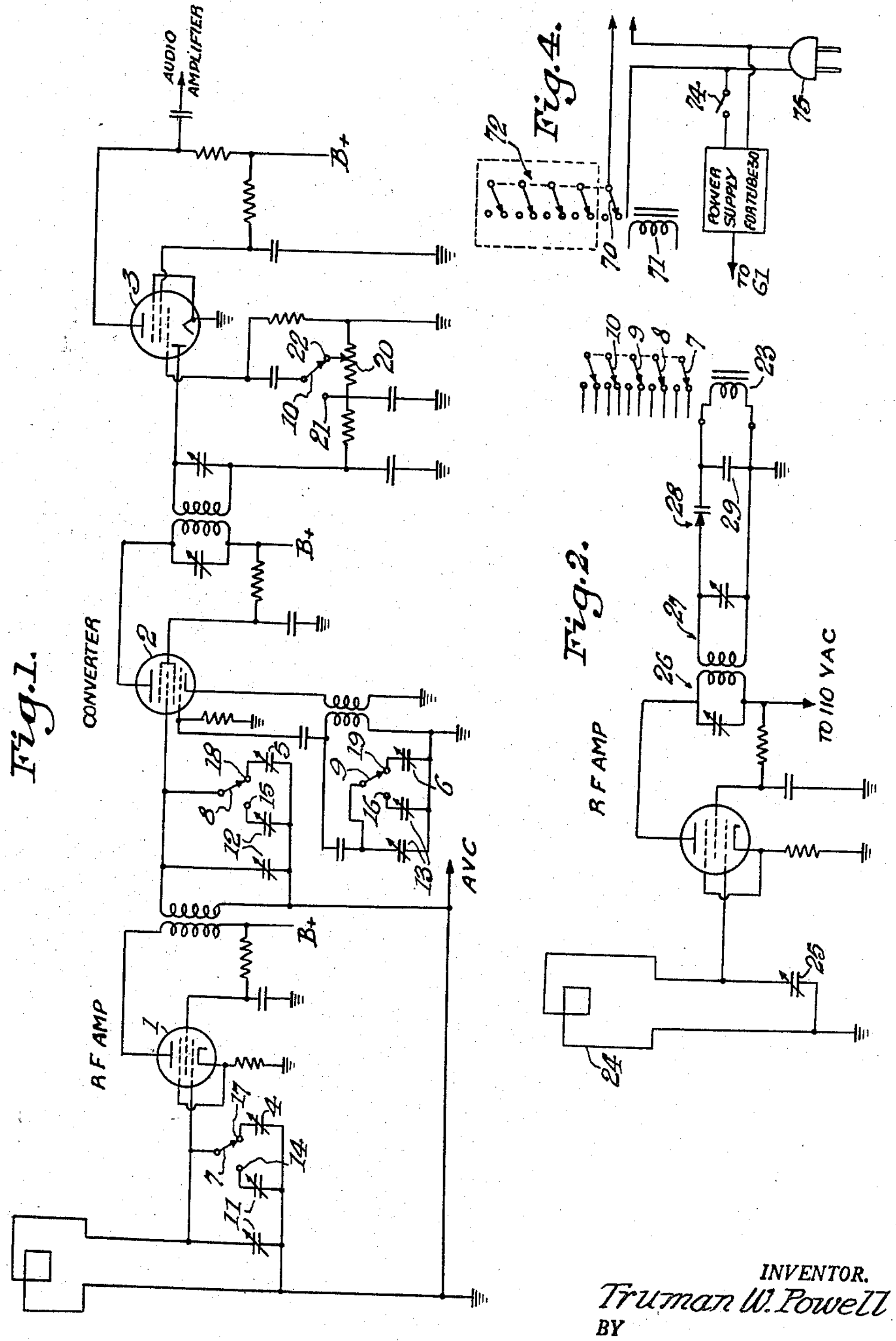
Fig. 2 is a schematic diagram of a radio frequency amplifier responsive to a predetermined frequency to perform as the monitoring apparatus of the instant invention and including components to actuate the alerting apparatus.
Fig. 4 is a wiring diagram for selectively controlling the power supply to the radio frequency stage independently and the following receiver stages of the embodiments shown in Figs. 1, 2 and 3 upon activation of the alerting apparatus by the monitoring apparatus.
Figure 3:
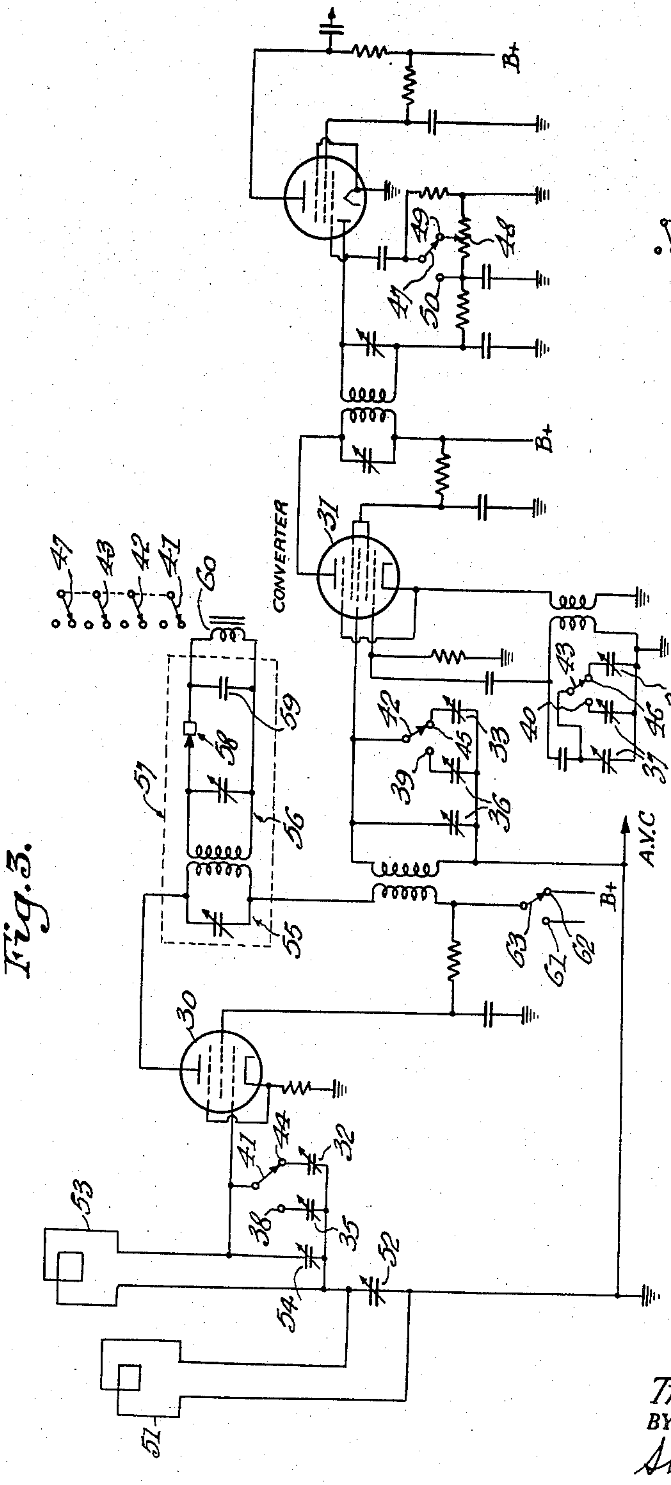
Fig. 3 is a schematic diagram of a portion of a conventional superheterodyne receiver modified to include the monitoring and alerting circuit components.
Figure 5:
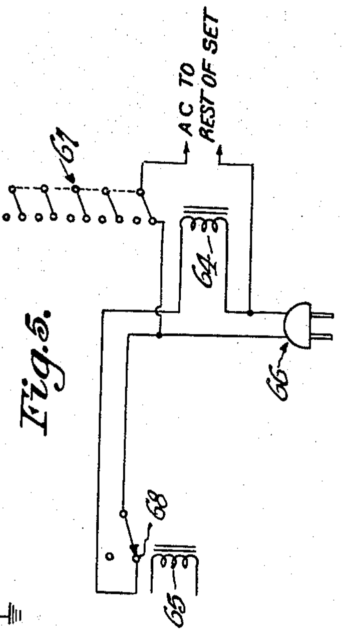
Figure 6:
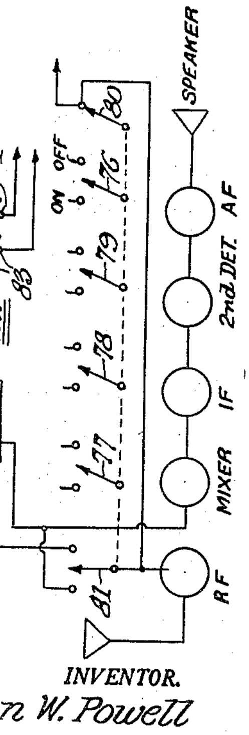

Fig. 5 is a wiring diagram for control of a supplemental relay to perform the switching operations of the relay in Figs. 2 and 3 responsive to reception of a signal of predetermined frequency by the monitoring apparatus; and Fig. 6 is a diagram of another embodiment of the invention wherein the on-off receiver switch is ganged to control the monitoring and alerting apparatus components added to a conventional receiver to convert it to perform the dual function of a receiver and monitoring and alerting apparatus.

Reference is now made to Fig. 1 which is a circuit diagram of a portion of a conventional superheterodyne receiver comprising a radio frequency amplifier stage, including a pentode 1, coupled to a mixer or converter stage, including a dual purpose tube 2, which in turn is coupled to the second detector stage including a pentode 3. The components shown, except for the modifications in accordance with the instant invention to be hereinafter described, are well known to those skilled in the electronic art and will therefor not be described in detail herein. The modifications in accordance with the instant invention which permit converting the conventional receiver portion as shown in Fig. 1 to an alerting circuit for the reception of predetermined frequencies include the addition of capacitors 4, 5 and 6 to the radio frequency, mixer and oscillator stages, respectively, and the addition of relay actuated switches 7, 8, 9 and 10, to be hereinafter further described, in the radio frequency, mixer, oscillator and second detector stages, respectively. Capacitors 11, 12 and 13 normally included in the radio frequency, mixer and oscillator stages, respectively, of the conventional radio receiver circuit are connected to terminals 14, 15 and 16 of the relay actuated switches 7, 8 and 9, respectively. The additional capacitors 4, 5 and 6 are connected to terminals 17, 18 and 19, of the relay actuated switches 7, 8 and 9, respectively. If it is desired that a plurality of predetermined frequencies may be received upon conversion of the conventional receiver to an alerting circuit, capacitors 4, 5 and 6 are variable and if a single predetermined frequency is desired these capacitors may be fixed of a value dictated by the value of inductance of the resonant circuit in each of the radio frequency, mixer and oscillator stages, respectively. The relay actuated switch 10 is connected across the volume control 20. Switch 10 permits turning the volume on full when connected to terminal 21 in the event the predetermined frequency determined by loop antenna 24 and condenser 25 which causes relay 23 to be actuated to connect capacitors 4, 5 and 6 is received or the volume control 20 may be used in the conventional manner by connection of terminal 22 when the circuit of Fig. 1 is used as a conventional receiver when the condensers 11, 12 and 13 are connected through switches 7, 8 and 9, respectively. In the event the circuit of Fig. 1 is to be used as an alerting circuit for one of the Conelrad frequencies, 640 or 1240 kc., capacitors 4, 5 and 6 would have to be selected to permit the respective associated circuits to be resonant at either of one of these frequencies so that when switches 7, 8 and 9 are actuated, the selected frequency will be received.

Actuation of switches 7, 8, 9 and 10 is accomplished by relay 23 which is connected in the output of the radio frequency amplifier illustrated in Fig. 2. In this circuit, loop antenna 24 and condenser 25 are tuned to a predetermined frequency, which for example may be a Conelrad frequency or any other predetermined frequency to be monitored by this circuit. The components of the coupled parallel resonant circuits 26 and 27 are selected to be resonant at the predetermined frequency to be monitored. The output of this radio frequency amplifier is rectified and filtered by the crystal diode 28 and condenser 29 and energizes the relay 23 which, when energized, operates the switches 7, 8, 9 and 10 in the circuit shown in Fig. 1.

The circuits of Figs. 1 and 2 for convenience may be housed as a single apparatus. When the circuit of Fig. 1 is used as a conventional radio receiver, with condensers 11, 12 and 13, which are the ganged main tuning condensers in the associated portions of the radio receiver or alerting portion of the apparatus, the circuit of Fig. 2 or the monitoring portion is energized and when the radio receiver or alerting portion of Fig. 1 is off, the monitoring portion remains energized to receive the predetermined frequency to be monitored. As hereinafter described, the relay 23 may be adapted to turn on the alerting circuit of Fig. 1 upon reception of the monitored, predetermined frequency by the circuit in Fig. 2. The monitoring circuit of Fig. 2 may be separately energized by a conventional selenium rectifier or other power supply or may be energized by the alternating voltage from the usual 110 volts A.C. supply since the output of the circuit of Fig. 2 is rectified and filtered by the crystal diode 28 and condenser 29.

The circuit shown in Fig. 3 combines the functions of the circuits of Figs. 2 and 1 and permits the use of only one radio frequency amplifier for both monitoring and alerting portions of the apparatus. In this modification, the radio frequency stage, including pentode 30, mixer or converter stage including dual purpose tube 31 and oscillator circuit are modified in a manner similar to the modification of these stages of the conventional superheterodyne receiver shown in Fig. 1. In Fig. 3 capacitors 32, 33 and 34 are added to the radio frequency amplifier, mixer and oscillator stages, respectively. Again, these condensers may be either fixed or variable depending on whether a single predetermined frequency or plurality of frequencies are to be individually received, respectively. In this modification, as in Fig. 1, it is necessary to connect the ganged main tuning condensers 35, 36 and 37, in the radio frequency amplifier, mixer and oscillator stages, respectively, to terminals 38, 39 and 40, of switches 41, 42 and 43, respectively. Capacitors 32, 33 and 34 are connected to terminals 44, 45 and 46 of switches 41, 42 and 43, respectively. Also, as in Fig. 1, a switch 47 is connected across the volume control 48 in the second detector stage. When the radio receiver is used as a conventional receiver, the volume control 48 is connected in the usual manner in the receiver circuit through terminal 49 of switch 47 and when only the alerting portion is energized switch 47 is connected to terminal 50 so that the volume control 48 is off. In this embodiment the portion of the radio frequency amplifier stage including loop antenna 51 and capacitor 52 are in series with the loop antenna 53 and capacitor 54 in the radio frequency amplifier stage of the receiver. Loop antenna 51 and capacitor 52 are sharply tuned to a predetermined frequency as must be the case of the parallel resonant circuits 55, 56 in the relay actuating circuit shown generally by 57. This latter circuit also includes a crystal diode 58 and a filter condenser 59 and relay 60. When a signal of predetermined frequency is received by the portion of the circuit, including loop antenna 51 and capacitor 52, the relay in the circuit shown generally by 57 in the plate circuit of tube 30 is actuated and causes switches 41, 42 and 43 to connect condensers 32, 33 and 34 thus permitting the conversion of the equipment to receive the frequency determined by the fixed value of capacitors 32, 33 and 34 or the preset condition of these capacitors, if they are variable. If the portion of the conventional receiver following the radio frequency amplifier, i.e. mixer, oscillator, second detector and audio stages are not energized when the monitored, predetermined frequency is received, actuation of the relay 60 will energize these latter stages and cause switch 47 to apply full volume or any other preset value to the receiver. If the receiver is operated in the conventional manner, reception of the predetermined frequency will automatically switch the receiver to the predetermined frequency as dictated by capacitors 32, 33 and 34. Provision must be made if the receiver is off, i.e. not operating in the conventional manner, to continue to supply plate voltage to the radio frequency amplifier stage from a separate plate supply source as represented by separate terminals 61, 62 of switch 63. If a conventional receiver modified in accordance with the present invention is to monitor and alert the reception of Conelrad frequencies, 640 or 1240 kc., the loop antenna 51 and capacitor 52 and the parallel resonant circuit shown generally by 57 may be made resonant to one of these frequencies or any other selected frequency or alternatively the components of these circuits may be selected to make them resonant to one of the Conelrad frequencies. This embodiment thus permits the use of a common radio frequency amplifier for both the monitoring and alerting circuits.

In the event that the sensitive relays 23 and 60 cannot operate the switches to accomplish the conversion as taught ni the instant invention, the circuit diagram in Fig. 5 shows the manner in which a second relay 64 may be energized responsive to operation of relay 65. As is well understood by those skilled in the art, energization of relay 65 in response to reception of a predetermined frequency by the monitoring portion of the circuits of Figs. 1 or 2 will cause the energizing source circuit 66 to relay 64 to be completed through contact 68 which will actuate the associated contacts shown generally by 67 corresponding to switches in the radio frequency amplifier, mixer, oscillator, volume control and separate power supply for the alerting portions of the circuits shown in Figs. 1 and 2. In Fig. 4, energization of relay 71 will convert the conventional receiver, such as in Fig. 1 to an alerting circuit tuned to a predetermined frequency and will connect the alternating current supply through contactor 70, if this portion of the apparatus has been turned off.

For the modification shown in Fig. 3 a separate power supply is required to energize the common radio frequency amplifier. The circuit diagram of Fig. 4 illustrates how this may be accomplished by closing switch 74 and connecting switch 63 to terminal 61. The relay 71 for actuating the switches connected in the various stages of the conventional receiver, such as in Fig. 3, to convert it to an alerting circuit tuned to a predetermined frequency may be the relays 23 or 65 or the supplemental relay 64 as in Fig. 5. Upon energization, it will operate the switches, shown generally by 72 in the various stages of the conventional receiver to convert it to an alerting circuit, in accordance with the principles of the instant invention and through contact 70 will connect the alternating current supply 75 to the stages following the common radio frequency amplifier. When the monitoring portion receives the predetermined signal frequency, switch 63 is connected to terminal 62 and switch 74 is opened for the alerting circuit, the conventional radio to receive the predetermined frequency.

The diagram shown in Fig. 6 is another modification wherein the on-off switch 76 of the conventional receiver is ganged with switch 77 in the radio frequency amplifier, switch 78 in the mixer, switch 79 in the oscillator, switch 80 in a separate supply circuit for the radio frequency amplifier stage and switch 81 which also connects a relay circuit similar to that shown in block 57 in Fig. 3 to the output of the radio frequency amplifier. Switches 77, 78 and 79 will thus connect capacitors, fixed or variable, in the radio frequency amplifier, mixer and oscillator which will tune these circuits to a predetermined frequency, which may be a Conelrad or other predetermined frequency. The parallel resonant circuit in the relay circuit must be adjusted to the predetermined frequency. Upon reception of the predetermined frequency the relay circuit 82 will close contacts 83 and 84 and supply plate and filament voltages from a separate supply, not shown, to the stages following the radio frequency amplifier stage so that the balance of the receiver following this stage will pass the predetermined alerting signal. When it is desired to use the receiver in the normal manner, and the on-off switch is turned on, the capacitors in the radio frequency amplifier, oscillator and mixer stages used for normal broadcast band reception will be connected, the separate power supply for the radio frequency stage and the relay circuit will be disconnected.

It is within the scope of the present invention to substitute transistors for the vacuum tubes shown in the various circuits in order to provide a more compact apparatus without departing from the principles taught herein.

Having described my invention what I claim as new and desire to secure by U. S. Letters Patent is:

1. In combination with a radio frequency receiving apparatus including a plurality of tuned circuits having frequency determining and circuit control components a monitoring circuit responsive to predetermined frequencies including circuit closing means actuated in response to reception of a signal of predetermined frequency by said monitoring circuit means, said circuit closing means connected to said frequency determining and circuit control components in said plurality of tuned circuits for effecting conversion of said radio frequency receiving apparatus to an alerting circuit for receiving signals of predetermined frequencies.

2. In combination with a radio frequency receiving apparatus a monitoring circuit responsive to a predetermined frequency, said radio frequency receiving apparatus having a plurality of tuned circuits and circuit energizing control means, each of said plurality of tuned circuits including a first capacitor means for varying the frequency response of each of said tuned circuits, a second capacitor means connected in each of said tuned circuits for adjustment thereof to a predetermined frequency, said monitoring circuit including a tuned circuit responsive to a predetermined frequency and circuit closing means electrically connected selectively to said first and second capacitor means and said circuit energizing control means for selectively controlling the operation of said radio frequency receiving apparatus upon reception of said predetermined frequency by said monitoring circuit whereby said radio frequency receiving apparatus is converted from a plural frequency receiving apparatus to a single predetermined frequency alerting circuit.

3. In combination with a radio frequency receiving apparatus an independent monitoring circuit responsive to a predetermined frequency, said radio frequency receiving apparatus having a plurality of tuned circuits and circuit energizing control means, each of said plurality of tuned circuits including a first capacitative network for varying the frequency response of each of said tuned circuits, a second capacitative element connected in each of said tuned circuits for adjustment thereof to a preselected frequency, said independent monitoring circuit including a tuned circuit responsive to a predetermined frequency and circuit closing means electrically connected selectively to said first capacitative network, said second capacitative element and said circuit energizing control means for selectively controlling the operation of said radio frequency receiving apparatus upon reception of said predetermined frequency by said independent monitoring circuit whereby said radio frequency receiving apparatus is converted from a plural frequency receiving apparatus to a single predetermined frequency alerting circuit.

4. In combination with a radio frequency receiving apparatus a monitoring circuit responsive to a predetermined frequency, said radio frequency receiving apparatus having a plurality of tuned circuits and circuit energizing control means, a first portion of said monitoring circuit being serially connected to a first one of said plurality of tuned circuits, a second portion of said monitoring circuit being electrically connected between said first one of said plurality of tuned circuits and a second one of said plurality of tuned circuits, each of said plurality of tuned circuits including a first capacitative network for varying the frequency response of each of said plurality of tuned circuits, a second capacitative element connected in each of said plurality of tuned circuits for adjustment thereof to a preselected frequency, said first and second portion of said monitoring circuit being responsive to said predetermined frequency, said second portion of said monitoring circuit including a tuned circuit and circuit closing means electrically connected selectively to said first capacitative network, said capacitative element and circuit energizing control means for selectively controlling the operation of said radio frequency receiving apparatus upon reception of said predetermined frequency by said first and second portions of said monitoring circuit whereby said radio frequency receiving apparatus is converted from a plural frequency receiving apparatus to a single predetermined frequency alerting circuit.

5. The combination recited in claim 4 wherein said first portion of said monitoring circuit comprises a parallel resonant circuit responsive to said predetermined frequency.

6. The combination as recited in claim 4 wherein said first one of said plurality of tuned circuits includes an energizing source independent of said radio frequency receiving apparatus and said radio frequency receiving apparatus following said first one of said plurality of tuned circuits is energized selectively by said circuit closing means responsive to reception of said predetermined frequency by said monitoring circuit whereby said radio frequency receiving apparatus is converted from a plural frequency receiving apparatus to a single frequency alerting circuit.

7. In combination with a radio frequency receiving apparatus a monitoring circuit responsive to a predetermined frequency, said radio frequency receiving apparatus including a plurality of tuned circuits having frequency determining and circuit control components, said monitoring circuit including sequentially connected primary and secondary circuit closing means actuated in response to reception of a signal of predetermined frequency by said monitoring circuit, said sequentially connected primary and secondary circuit closing means connected to said frequency determining and circuit control components for selectively connecting said frequency determining and circuit control components in said plurality of tuned circuits for effecting conversion of said radio frequency receiving apparatus to an alerting circuit for receiving a fixed frequency signal upon reception of said predetermined frequency by said monitoring circuit.

8. A radio frequency receiving apparatus including a plurality of tuned circuits, each of said plurality of tuned circuits having a capacitative network for varying the frequency response thereof and a capacitative element connected in each of said plurality of tuned circuits for adjustment thereof to a preselected frequency, a first energizing means for said radio frequency receiving apparatus and a source for independently energizing a first one of said plurality of tuned circuits, resonant circuit means responsive to said preselected frequency connected to said first one of said plurality of tuned circuits, circuit interrupting means connected between said resonant circuit means and said first one of said plurality of tuned circuits, electro magnetic circuit control means connected to said resonant circuit means, a first switch means for controlling said first energizing means, means mechanically connected to said first switch means for simultaneously selectively electrically connecting said capacitative network and said capacitative element in each of said plurality of tuned circuits, said independent energizing source and said resonant circuit means to said first one of said plurality of tuned circuits upon manipulation of said first switch means whereby the portion of said radio frequency receiving apparatus following said first one of said plurality of tuned circuits is energized by said first energizing means through said electro-magnetic circuit control means and is converted from a plural frequency receiving apparatus to a single frequency receiving apparatus upon reception of said preselected frequency by said first one of said plurality of tuned circuits and said resonant circuit means.

9. Apparatus as recited in claim 8 wherein said means mechanically connected to said first switch means comprises a series of ganged switches, each of said series of ganged switches being individually adapted for selectively connecting each of said capacitative networks and said capacitative element in each one of said plurality of tuned circuits said circuit interrupting means and a second switch means for connecting and disconnecting said independent energizing means to said first one of said plurality of tuned circuits upon manipulation of said first switch means.

References Cited in the file of this patent

UNITED STATES PATENTS

| | | |
|---|---|---|
| 2,216,671 | McDonald | Oct. 1, 1940 |
| 2,330,241 | Roberts | Sept. 28, 1943 |
| 2,340,798 | Deal | Feb. 1, 1944 |